June 11, 1968   D. F. CAMERON ET AL   3,388,142

METHOD FOR PRODUCING DIALKYLALUMINUM HYDRIDE COMPOUNDS

Filed July 12, 1963

INVENTORS
MALCOLM M. TURNER &
DANIEL F. CAMERON
BY Bayless E. Rutherford, Jr.
AGENT

United States Patent Office 3,388,142
Patented June 11, 1968

3,388,142
METHOD FOR PRODUCING DIALKYL-
ALUMINUM HYDRIDE COMPOUNDS
Daniel F. Cameron and Malcolm M. Turner, Ponca City, Okla., assignors to Continental Oil Company, Ponca City, Okla., a corporation of Delaware
Filed July 12, 1963, Ser. No. 294,550
4 Claims. (Cl. 260—448)

ABSTRACT OF THE DISCLOSURE

Invention has the following aspects:

A method for preparing dialkylaluminum hydride by the reaction of trialkylaluminum, aluminum, and hydrogen wherein the reactants flow upward in a single-stage reaction zone and wherein the movement of the reactants is arrested in the upper portion of the reaction zone to settle out unreacted aluminum metal.

Apparatus, particularly suitable for preparing dialkylaluminum hydride, wherein an important feature is a solids settling section at the upper end of the reaction chamber.

---

This invention relates to the preparation of trialkyl aluminum compounds, and more particularly, to the preparation of the dialkyl aluminum hydride intermediate which is utilized in preparing such compounds. More specifically, but not by way of limitation, the present invention relates to improvements in the process and apparatus utilized to prepare dialkyl aluminum hydride, using aluminum, hydrogen and trialkyl aluminum as the reactants.

It is now well known that valuable trialkyl aluminum compounds can be manufactured from aluminum, hydrogen and an α-olefinic material, such as ethylene. This technique is described in United States Patent 2,787,626 to Redmond, as well as in several United States and foreign patents issued to Karl Ziegler. The preparation of trialkyl aluminum compounds, also termed aluminum trialkyls, proceeds by the following reactions:

(1)   $Al + \frac{3}{2}H_2 + 2AlR_3 \rightarrow 3AlR_2H$ (2)   $3AlR_2H + 3R^- \rightarrow 3AlR_3$ where R is an alkyl radical and R⁻ is supplied by a suitable α-olefinic material or a mixture of α-olefinic materials. Instead of the alkyl substituents of the trialkyl aluminum reactant and product being identical, alkyl groups of differing structure may be bound to the aluminum.

From Reactions 1 and 2, it may be seen that a net yield of 1 mole of trialkyl aluminum is realized for each 2 moles of trialkyl aluminum utilized in the first reaction. Thus, once the reactions are initiated, a portion of the trialkyl product may be recycled to the situs of the initial reaction and used therein so that the only materials supplied and consumed in the reactions are aluminum, hydrogen and an α-olefinic material.

It is known that the two reactions set forth above may be carried out either in the same reaction vessel or in separate reaction vessels. It is also known that several advantages accrue when the reactions are conducted in separate reaction vessels, most notable of which is the improvement in yield of the trialkyl aluminum product.

Heretofore, several proposals have been advanced for improving the rate of progression and efficiency of the initial reaction which yields the dialkyl aluminum hydride intermediate according to Equation 1 set forth above. In co-pending application for United States Letters Patent Ser. No. 223,755, filed Sept. 14, 1962, and assigned to the assignee of the present invention, a multistage reaction vessel and method for introducing to, and passing the reactants through, such vessel for the purpose of producing dialkyl aluminum hydride are described. Another type of multistage reaction vessel for use in the production of dialkyl aluminum hydride for use in the process of manufacturing trialkyl aluminum compounds is described in United States Patent 2,930,808 issued to Kurt Zosel on Mar. 29, 1960.

Although the multistage reaction vessel described in the cited co-pending application permits several advantages to be realized over the synthesis when practiced in the Zosel reactor, both the reaction vessels described in the co-pending application and in the Zosel patent are multistage vessels with the reaction set forth in Equation 1 above being carried out in a plurality of separate stages within the vessel. In the Zosel reactor, the holdup of aluminum particles which is effected by the provision of a plurality of screens and gas barriers results in a more complete reaction of the aluminum with the result that little or no aluminum metal carryover from the reactor occurs. On the other hand, larger amounts of fresh aluminum must be introduced to the bottom of the reactor by virtue of this arrangement, and no pre-activation of unreacted particles of the aluminum which are recycled to the reactor occurs. Moreover, the screens which are provided in the Zosel structure and the gas barriers which are developed in association with such screens during the use of the reactor limit the particle size of the subdivided aluminum metal which may be employed, and also can result in partial plugging of the screen, uneven rates of reaction and inefficient conversion occurring in one or a plurality of the reaction zones defined by the reaction vessel and the partitioning screens located therein.

The reaction vessel described in the cited copending application constitutes a substantial improvement over the Zosel reactor in that the possibility of clogging of screens is obviated and a more homogeneous reaction mixture is attained in each of the several stages contained within the reactor. Moreover, the reaction vessel which is described in the co-pending application does achieve pre-activation of some of the aluminum metal introduced to the reaction vessel by originally introducing an amount of aluminum metal to the reactor which substantially exceeds the stoichiometric requirements of the reaction, and then recycling through the subsequent stages of the process for producing trialkyl aluminum compounds, the unreacted aluminum which has been brought to a highly activated state, and ultimately, reintroducing this aluminum to the reaction vessel used to produce the dialkyl aluminum hydride. The ability to thus activate the aluminum prior to its introduction to the multistage reaction vessel permits the reaction producing the dialkyl aluminum hydride to be carried out at higher conversion rates. However, the entrainment of the aluminum metal in the effluent product from the reactor, and the passage of this metal with such product through downstream pumps, valves and reaction vessels presents a problem of maintaining continuous operability due to the requirement of cleaning out valves and reaction vessels which have become fouled or clogged with the entrained aluminum metal.

Moreover, because of the necessity of retaining the concentration level of the unreacted aluminum metal carried over in the effluent from the hydrogenation reactor below a certain maximum value, the total concentration of activated and fresh or make-up aluminum in the hydrogenation reactor used to produce the dialkyl aluminum hydride must be accordingly limited with the result that the reaction rate occurring in this reaction vessel is correspondingly limited.

Finally, the presence of aluminum metal in the dialkyl aluminum product downstream from the hydrogenation reactor has some effect in decreasing the total yield of trialkyl aluminum in that the aluminum carries certain trace metals, such as zirconium and titanium, which catalyze the decomposition of the hydride to aluminum metal, hydrogen and aluminum trialkyl. In other words, although the dialkyl aluminum hydride intermediate produced in the initial hydrogenation reaction is a fairly stable compound under normal conditions, the reaction by which such intermediate is produced is a reversible reaction, and the dialkyl aluminum hydride tends to undergo decomposition in the presence of finely divided aluminum containing small amounts of zirconium and titanium and under low hydrogen pressures according to the reaction:

(3) 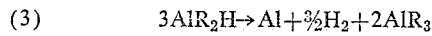$3AlR_2H \rightarrow Al + \tfrac{3}{2}H_2 + 2AlR_3$

This decomposition or reverse reaction does not occur in the hydrogenation reaction vessel to any substantial degree because of the high hydrogen pressure prevailing therein and the effect of mass action in driving the reaction toward the formulation of the dialkyl aluminum hydride. However, downstream from the hydrogenation reactor after the hydrogen pressure has been substantially lowered, the effect of the entrainment of a portion of the unreacted aluminum metal from the hydrogenation reactor is to cause some decomposition of the hydride and a reconstitution of the original reactants therefrom. It would therefore be desirable, but for the advantage derived from recycling a portion of the aluminum metal in a high state of activation, to eliminate as much of the entrained aluminum metal as possible from the hydrogenation reactor effluent.

The present invention provides an improved apparatus for use in the production of the dialkyl aluminum hydride used in the production of trialkyl aluminum compounds and also contemplates improvements in the method employed in producing such intermediate in the improved hydrogenation reaction vessel of the invention. Broadly, the novel single stage hydrogenation reactor used in the present invention comprises a reaction section or chamber into which the reactants are introduced, means for thoroughly agitating the reactants in the reaction chamber to maintain the subdivided aluminum metal in suspension in the liquid reactants and uniformly distributed therethrough, and a settling section integrally connected to the reaction chamber and communicating therewith to receive the reactants and permit them to reach a relatively quiescent state in which the unreacted aluminum metal will separate from the liquids by virtue of the difference in density which obtains. From the settling section of the single stage reaction vessel, dialkyl aluminum hydride product is removed in a relatively aluminum-free state and is then ultimately passed to a second reaction vessel where the hydride is contacted with an α-olefinic compound, such as ethylene, to produce the trialkyl aluminum product sought. Since there is a net yield of 1 mole of trialkyl aluminum, the net yield may be cycled to storage and the balance of the product recycled to the hydrogenation reactor in the manner hereinbefore described.

In employing the single stage reaction vessel characterized in having a reaction chamber equipped with a suitable agitating device, and a settling section constructed specifically to segregate the unreacted solid aluminum metal from the liquid reactants and reaction product, the present invention permits the problems heretofore associated with the entrainment of large amounts of aluminum metal in the product stream to be obviated without sacrificing the advantages accruing from the pre-activation of a substantial amount of the aluminum metal, and the retention of this activated metal in the reactor. Because of this disposition of excess aluminum metal in the hydrogenation reactor, the reaction rate is improved and the net amount of fresh aluminum which must be introduced to the hydrogenation reactor is reduced. In other words, the apparatus and process employed in the present invention permit two distinct advantages to be obtained over the apparatus and method used in producing dialkyl aluminum hydride as described in the hereinbefore cited co-pending application. First, by drastically reducing the amount of aluminum which is discharged in the hydride effluent from the hydrogenation reactor, the necessity of frequently stopping the process in order to clean out valves, repair clogged valves and perform other maintenance required as a result of the passage of the aluminum metal through the downstream equipment is obviated. Second, the hydrogenation reactor which is employed in the present invention permits a total aluminum concentration to be maintained in the hydrogenation reactor which is much higher than the concentration of aluminum in the reactants charged to the reactor, and therefore improves the total yield of the hydride obtainable. For example, concentrations of 40 percent by weight aluminum in the hydrogenation reactor are feasible as a result of the hold-up of unreacted aluminum metal so that the reaction rate need not be limited by the inability to provide in the reactor a large excess of active aluminum. Previously, the concentration of aluminum in the reactor was limited by limitations on the capacity of pumps and other equipment to pump high concentration slurries of aluminum metal into the reactor coupled with the fact that no settling-concentrating action occurred in the reactor.

It should also be noted that, because of the absence of the partitioning screens used in multistage reactors of the type described in the Zosel patent, the single stage reaction vessel used in the present invention can be efficiently employed when aluminum metal of relatively large particle size is charged to the reactor. This presents an economic advantage in that aluminum metal in chip form may be more economically obtained than the finely divided granular or powdered aluminum.

To more specifically describe one embodiment of the single stage hydrogenation reactor used in the present invention, the reaction vessel includes an elongated, upwardly extending reaction chamber in which there is positioned an agitating device, and an enlarged settling section positioned over the reaction chamber and in communication therewith a plurality of baffle plates being provided in the settling section to damp out the turbulence and upward movement of the reactants and reaction products so that the aluminum metal which is unreacted may settle out and gravitate downwardly in the reaction vessel rather than being carried over into the dialkyl aluminum hydride effluent. The reactants are preferably introduced to the bottom of the reactor in at least two streams, (a) hydrogen gas and (b) a slurry of aluminum metal in trialkyl aluminum and a suitable inert solvent. The rate of introduction of the reactants and the agitating action of the agitator located in the reaction chamber cause the reactants to move upwardly and toward the settling section with the finely divided aluminum metal being held in suspension as a result of the upward movement and centrifugal agitation. A surplus of the aluminum metal is initially introduced and some of the metal therefore arrives at the settling section of the reaction vessel in solid particulate form. However, the metal which is not consumed in the reaction is activated in passing through the reaction chamber, and after being settled out in the settling section tends to gravitate back into the reaction chamber. There is thus provided in the reaction chamber a substantial excess of aluminum, the major portion of which has been activated by passage through the reaction chamber and is therefore able to enter into the hydrogenation reaction more readily than fresh unactivated aluminum being charged to the bottom of the reactor.

The dialkyl aluminum hydride product from the hydrogenation reaction vessel is passed through a high pressure flash drum where a substantial amount of the entrained hydrogen gas and methane are removed. The hydride is then passed to an ethylation reactor where an α-olefin is contacted with the dialkyl aluminum hydride to yield the desired trialkyl aluminum product. Approximately two-thirds of the product is then recycled to the hydrogenation reactor in the manner hereinbefore described.

From the foregoing description of the invention, it will be apparent that it is a major object of the present invention to provide an improved process and apparatus for producing dialkyl aluminum hydride.

Another object of the present invention is to provide an improved process for producing trialkyl aluminum in which the conversion rate, and the yield of the trialkyl aluminum product are improved.

Another object of the invention is to improve the efficiency and versatility of conditions with which a reaction involving the contact of a gaseous material with a liquid and a finely divided solid material may be carried out in a single stage reaction vessel.

It is a more specific object of the present invention to improve the efficiency with which dialkyl aluminum hydride may be produced by contact of finely divided aluminum metal with hydrogen gas and a trialkyl aluminum compound.

Another object of the present invention is to permit dialkyl aluminum hydride to be more economically manufactured by contacting a trialkyl aluminum, metallic aluminum and hydrogen in a single stage reaction vessel in which the reaction chamber is unobstructed by partitioning screens or baffle plates so that less expensive chipped aluminum having a relatively large particle size may be employed.

An additional object of the present invention is to reduce the total amount of aluminum metal which must be charged to a reaction vessel in order to produce dialkyl aluminum hydride by reacting the aluminum metal with hydrogen and a trialkyl aluminum compound.

Another object of the present invention is to reduce the equipment maintenance and repairs required in servicing pound. Because of the pyrophoric nature of the trialkyl aluminum by a two-step process in which dialkyl aluminum hydride is first produced by the reaction of aluminum metal, hydrogen gas and trialkyl aluminum, and in which the dialkyl aluminum hydride is then converted to trialkyl aluminum by contact with an α-olefin in a second stage of the process.

In addition to the foregoing objects and advantages, additional advantages of the invention will become apparent as the following detailed description thereof is read in conjunction with a perusal of the accompanying drawings which illustrate our invention.

Figure 2:
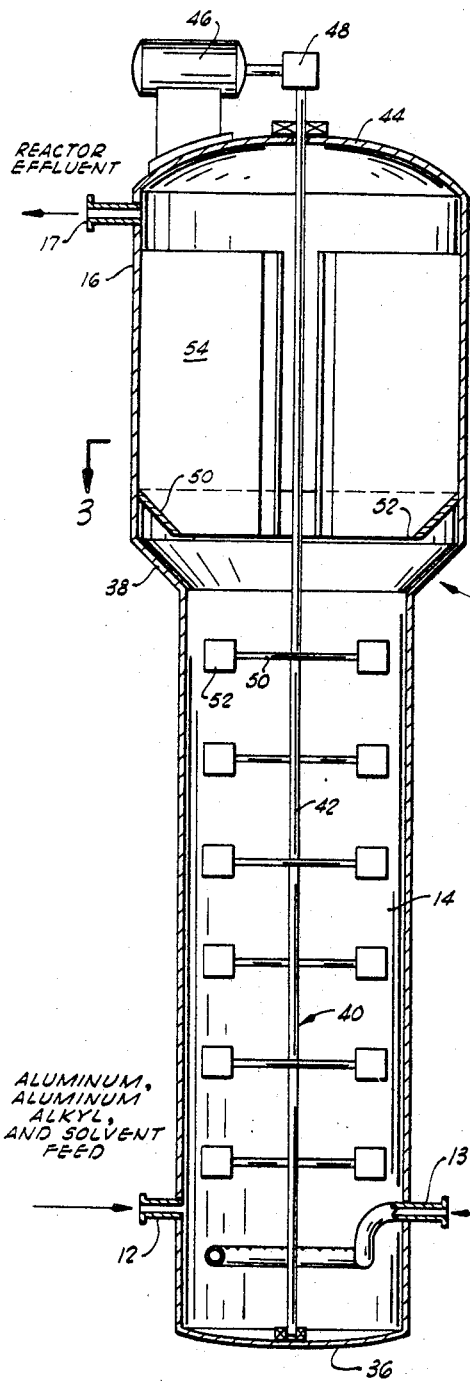
FIGURE 2 is a vertical sectional view taken through the center of one embodiment of the novel single stage reaction vessel utilized in the system of the present invention for producing dialkyl aluminum hydride.
Figure 1:
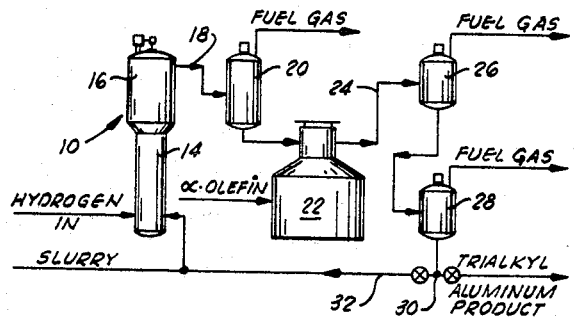
FIGURE 1 is a schematic flow diagram illustrating the apparatus utilized in practicing the method of the present invention and showing the flow of the reactants, intermediates and products in the reaction system.

Referring now to the drawings in detail, and particularly to FIGURE 1, reference character 10 designates a single stage hydrogenation reaction vessel of the type used in the present invention and the details of which are illustrated in FIGURE 2. To the reaction vessel 10 are charged the reactants comprising subdivided metallic aluminum, hydrogen and a trialkyl aluminum compound. Because of the pyrophoric nature of the trialkyl aluminum compound, a preferred mode of operation entails the introduction of the finely divided aluminum to the reaction vessel 10 in the form of a slurry of the aluminum metal in the trialkyl aluminum compound and a substantial quantity of a suitable inert hydrocarbon solvent, such as kerosene, toluene, benzene, hexane, octane, xylene, etc. For reasons of availability and economy, a kerosene fraction having a boiling range of from about 360° F. to about 500° F. constitutes the most preferred solvent. The aluminum metal-trialkyl aluminum-inert solvent slurry is introduced to the bottom of the reaction vessel 10 through a suitable inlet port 12 illustrated in FIGURE 2.

The finely divided aluminum metal may be prepared in a number of ways, such as by grinding, chipping and pulverization. The finely divided aluminum metal employed may have a particle size as small as 3 microns or as large as 0.25 inch. Preferably, the subdivided aluminum is prepared by a chipping procedure, since this type of comminution may be practiced much more economically than reduction of the aluminum to powder or granules. The aluminum chips, the use of which is preferred, have a particle size ranging from about 0.001 inch to about 0.125 inch. Actually, most of the chips prepared by the most economic method have a rectangular or sliver-like configuration with dimensions of about 0.004 inch in thickness, about 0.187 inch in length, and about 0.063 inch in width.

A small amount of zirconium or titanium metal is intentionally added to the aluminum metal, since such metals act as activators and promote the reaction of the aluminum with the other reactants in the single stage hydrogenation reaction vessel 10. About 0.20 percent by weight of the activator metal, based on the weight of aluminum, may be effectively added to the subdivided aluminum. The manner of addition of the activator metal and the benefits derived from its addition are described in application for United States Letters Patent Ser. No. 58,222, filed Sept. 26, 1960, now U.S. Patent No. 3,104,252 and assigned to the assignee of the present invention.

The alkyl groups of the trialkyl aluminum compound charged to the first reactor preferably contain between 2 and 20 carbon atoms and, as previously indicated, may be identical or different. Examples of trialkyl aluminum compounds which may be utilized in the hydrogenation reaction are triethyl aluminum, tripropyl aluminum, tributyl aluminum, triisobutyl aluminum, tripentyl aluminum, trihexyl aluminum, tri-3-methyloctyl aluminum, trinonyl aluminum, tri-4-methyl-3-ethyl-decyl aluminum, tridodecyl aluminum, tripentadecyl aluminum, tri-6-butyl-tridecyl aluminum, trioctadecyl aluminum, diethylpropyl-aluminum, hexylheptyldodecyl aluminum, dioctylnonyl aluminum, 3-methylheptyloctyldecyl aluminum, 5-methyl, 3-ethyldecyldodecyltetradecyl aluminum, diisobutylpentadecyl aluminum, 4-ethylnonyldodecyltetradecyl aluminum, tri-5-octyl-3-methyleicosyl aluminum, tetradecylheptadecylinonadecyl aluminum and trinonadecyl aluminum. In the event the trialkyl aluminum compound yielded by the ethylation reaction (Reaction 2 above) corresponds to that which is to be charged to the reaction vessel 10 for carrying out Reaction 1, a portion of the product of Reaction 2 may be utilized in making up the slurry charged to the reaction vessel. Where it is merely desired to produce mixed trialkyl aluminum compounds, such recycling may be practiced regardless of the α-olefins utilized in Reaction 2 or the types of trialkyl aluminum compounds produced.

At the commencement of the reaction, the aluminum metal is preferably present in the slurry stream entering the hydrogenation reaction vessel 10 in a stoichiometric excess over that which is required to complete the reaction according to Reaction 1 hereinbefore set forth. The use of such stoichiometric excess permits the unreacted excess aluminum which is carried to the top of the reaction vessel to be highly activated without consumption in the reaction and retained by the settling action hereinafter described in the reaction vessel. The excess activated aluminum retained in the reaction vessel 10 is effective, by virtue of its high state of activation, coupled with the mass action effect of the excess of this reactant, to substantially reduce the residence time required for the reactants in the multitage reaction vessel, and to convert larger amounts of the reactants to the dialkyl aluminum hydride product.

It should be understood, nevertheless, that though the employment of a stoichiometric excess of aluminum in the slurry feed to the hydrogenation reaction vessel 10 is preferred at the outset of the reaction for the reasons enumerated, the process is operative using, even at the beginning of the continuous operation, amounts of aluminum amounting to less than the stoichiometric quantity. After the process has been started, it will usually be desirable to reduce the aluminum charged to the reactor to a stoichiometric quantity or less due to the build up of settled out, activated aluminum in the reaction vessel. The aluminum metal will generally constitute from about 2 percent by weight to about 8 percent by weight of the total weight of the reactants charged to the reaction vessel 10.

The hydrogen gas may be introduced in its entirety to the bottom of the reactor 10 through an intake port 13 positioned at substantially the same level as the point of introduction of the aluminum-trialkyl aluminum slurry, or it may be introduced at several vertically spaced points along the lower portion of the reaction vessel 10, which lower portion will hereinafter be termed the reaction chamber and which is designated by reference character 14. The hydrogen is introduced to the reaction chamber 14 in sufficient quantity and at a sufficient velocity to maintain the hydrogen partial pressure in the vessel in the range of from about 200 p.s.i.g. to about 5000 p.s.i.g., and preferably between about 500 p.s.i.g. and 2500 p.s.i.g. The temperature in the hydrogenation reaction vessel 10 is maintained in the range of from about 200° F. to 350° F. with a range of from about 230° F. to about 290° F. being preferred. High reaction temperatures should be avoided as they cause an increase in the occurrence of the following undesirable side reaction:

(4) $AlR_3 + H_2 \rightarrow RH + AlR_2H$

Hydrogen to trialkyl aluminum mole ratios of from about 0.75:1 to about 5:1 may be utilized.

Effluent from the hydrogenation reaction vessel 10 is withdrawn from the upper end of the vessel after the reaction mixture has passed upwardly into a settling section of the reaction vessel designated by reference character 16. The effluent consists predominantly of dialkyl aluminum hydride and the inert hydrocarbon solvent with a small amount of subdivided aluminum metal, hydrogen gas and methane gas entrained in the hydride reaction product. The effluent from the single stage hydrogenation reaction vessel 10 flows through a discharge port 17 and a conduit 18 to a high pressure flash tank 20 where a portion of the hydrogen and methane gas in the dialkyl aluminum hydride product stream are flashed from the mixture. In the high pressure flash tank 20, the hydrogen pressure on the reaction product is lowered to from about 300 p.s.i.g. to about 500 p.s.i.g. This permits a sufficient hydrogen pressure to be retained on the dialkyl hydride stream to minimize the decomposition of this intermediate compound by the reversible reaction hereinbefore described, but is not a sufficiently high hydrogen pressure to cause substantial hydrogenation of the olefinic material introduced in the ethylation reactor downstream from the high pressure flash tank for the purpose of converting the intermediate to the trialkyl aluminum final product. The temperature of the hydrogenation reaction effluent in the high pressure flash tank is from about 68° F. to about 338° F. Moreover, by maintaining the temperature in approximately the same range as that which is utilized in the single stage hydrogenation reaction vessel 10, i.e., 210° F. to 338° F., little, if any, preheat is required to bring the process stream to the desired temperature for final conversion to the trialkyl aluminum product which is produced in the ethylation reactor by contact of the hydride intermediate with a suitable α-olefinic material. This temperature range is therefore preferred.

From the high pressure flash tank 20, the dialkyl aluminum hydride intermediate, saturated with hydrogen gas, is next passed continuously into a second reaction vessel 22 where it is contacted with α-olefinic material to yield a trialkyl aluminum product according to Reaction 2 as set forth above. Another way of expressing the reaction occurring in the reaction vessel 22 is (5) 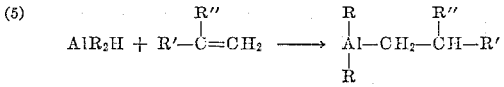

where R is as defined hereinbefore, R′ is selected from a class consisting of hydrogen and alkyl groups containing from 1 to 18 carbon atoms and R″ is selected from the class consisting of a methyl group and hydrogen.

It will be noted that, by selection of the α-olefinic material or materials introduced to the second reaction vessel 22, the molecular character of the trialkyl aluminum compound which is produced may be varied. Either a single α-olefinic material or mixed α-olefins may be charged to the second reaction vessel 22. The residence time of the reactants in the reaction vessel 22 is from about 1 minute to about 25 minutes and the reaction temperature maintained therein is between about 200° F. and about 300° F. Preferably, there is employed a residence time of from about 1.5 minutes to about 6 minutes and a temperature of from about 250° F. to about 320° F.

Examples of suitable α-olefinic compounds having the structural formula as defined include, but are not limited to, ethylene, propylene, 1-butene, 1-pentene, 1-hexene, 1-heptene, 1-octene, 4-hexyl-1-nonene, 2-methyl-1-butene, 4,4-diethyl-1-diethyl-1-decene, 1-eicosene, 1-tridecene, 1-hexadecene, and 3,4-dibutyl-1-octene.

The trialkyl aluminum product from the reaction vessel 22 is passed through a conduit 24 to an intermediate pressure flash tank 26. The effluent from the second reaction vessel 22 contains, in addition to the trialkyl aluminum product, a substantial amount of the inert hydrocarbon solvent, some dialkyl aluminum hydride intermediate, a small quantity of hydrogen gas and larger quantities of methane, ethylene and ethane. In the intermediate pressure flash tank 26, the temperature is retained in substantially the same range utilized in the second reaction vessel 22, but the pressure is lowered to about 35 pounds p.s.i.g. The excess hydrogen gas, methane, ethylene and ethane are flashed from the trialkyl aluminum product and the liquid product and inert solvent are then preferably passed through a low pressure flash tank 28 where the pressure is reduced to approximately atmospheric pressure. The net yield of the trialkyl aluminum product is then discharged through a conduit 30 to suitable storage tanks, with a portion of the product amounting to approximately two-thirds of the total product being recycled through conduit 32 to single stage hydrogenation reactor 10.

Having described the general reaction conditions and course of flow of reactants and reaction products which are utilized in practicing the process of the present invention, the details of construction of the novel, single stage hydrogenation reaction vessel 10 which is utilized for carrying out the hydrogenation reaction to produce the dialkyl aluminum hydride intermediate will next be described. Reference is made to FIGURE 2 of the drawings which is a vertical sectional view taken through the center of the single stage reaction vessel 10 and illustrating the details of construction thereof. In a preferred embodiment of the invention, the reaction vessel 10 comprises two major divisions which may be termed the reaction chamber 14 and the settling section 16.

Figure 3:
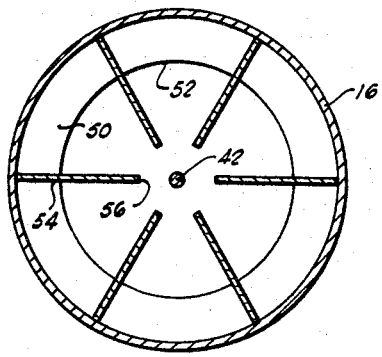
FIGURE 3 is a view in section taken along line 3—3 of FIGURE 2 and constituting a horizontal section through the center of the settling section of the hydrogenation reactor used in the present invention.

In the embodiment of the invention illustrated in FIGURES 2 and 3, the reaction chamber 14 comprises an elongated, generally cylindrical, vertically extending tank which is closed at its lower end by a bottom plate 36. The settling section 16 is also of generally cylindrical construction and is preferably of larger diameter than the reaction chamber 14 in order to enhance the classifying effect on the aluminum metal which is achieved in the settling section. The settling section 16 is mounted at the top of the reaction chamber 14 and is in communication therewith as illustrated in FIGURE 2. A generally frusto-conical section 38 interconnects the settling section 16 with the reaction chamber 14.

As the reactants enter the lower end of the reaction chamber 14, they are thoroughly agitated by a stirring or agitating assembly designated generally by reference character 40. The agitating assembly comprises an elongated shaft 42 which extends coaxially through the reaction chamber 14 and settling section 16 and is journaled at its lower end in the bottom plate 36 and at its upper end in a top plate 44 which covers the settling section 16. The shaft 42 is driven in rotation by a suitable motor 46 through a gear reduction box 48. Along the portion of the shaft 42 which is positioned in the reaction chamber 14, a plurality of radially extending rods 50 are provided and each carry at their free outer ends a paddle or turbine blade 52. The rods 50 and paddles 52 are spaced axially along the shaft 42 and the rods are keyed to the shaft for rotation therewith. It will be apparent in referring to FIGURE 2 that as the shaft 42 is rotated the reactants are agitated and a vortical or swirling movement is imparted to the reactants in the reaction chamber 14. This motion, coupled with the upward motion imparted to the reaction mixture, causes the reaction mixture to move upwardly toward the settling section 16 with the subdivided aluminum metal suspended therein.

In the embodiment of the invention illustrated in FIGURES 2 and 3, there is positioned within the settling section 16 of the hydrogenation reactor 10, a plurality of baffle plates which reduce the turbulence in the upflowing reaction mixture and also function to reduce the upward velocity of the mixture in the reaction vessel 10. The baffle plates include a circumferentially extending, downwardly and inwardly tapered baffle plate 50 which is generally frusto-conical in configuration and extends generally parallel to the frusto-conical section 38 of the reaction vessel 10. The free inner edge of the circumferentially extending baffle plate 50 is in approximate alignment with the wall of the reaction chamber 14 as is best illustrated in FIGURE 2.

In addition to the circumferentially extending baffle plate 50, a plurality of radial baffle plates 54 extend radially inwardly from the walls of the settling section 16 and terminate in inner edges 56 which are spaced substantially equidistantly from the shaft 42. This relationship is best illustrated in FIGURE 3. The radial baffle plates 54 preferably terminate at their upper ends at positions spaced downwardly from the discharge port 17 so as to permit the reaction product to be withdrawn freely from the settling section 16.

In the operation of the hydrogenation reaction vessel 10, the reactants in the form of an aluminum-trialkyl aluminum-solvent slurry and hydrogen gas are introduced to the lower portion of the reaction chamber 14. The reactants enter the reaction chamber 14 at a sufficient velocity to assure an upward movement of the reaction mixture in the reaction chamber 14 which, coupled with the centrifugal agitation resulting from the use of the agitating assembly 40, will cause the subdivided aluminum metal to remain suspended in the upwardly moving mixture. In other words, as the reaction mixture moves upwardly towards the settling section 16, the rotational movement of the paddles 52 induces a vortical movement in the reaction mixture which retains the aluminum metal suspended therein and carries it upwardly toward the top of the reaction chamber. The general direction of movement of the reaction mixture is thus upwardly and outwardly.

As the reaction mixture passes through the frusto-conical section 38, it tends to move outwardly and under the circumferentially extending baffle plate 50. This baffle plate tends to reduce the upward velocity of the reaction mixture, an effect which is furthered by the increased or enlarged diameter of the settling section 16. The swirling or vortical movement of the reaction mixture is damped out by contact with the radial baffle plates 54 so that by the time the reaction mixture reaches the upper portion of the settling section 16, it has been deprived of a substantial portion of the swirling motion and a part of the upward velocity which it acquired in the reaction chamber 14. As a result of the reduction in agitation in the reaction mixture, the solid aluminum metal particles which have not been spent in the reaction gravitate downwardly in the settling section and tend to re-enter the reaction chamber 14. The dialkyl aluminum hydride product which has been produced during the passage of the reactants through the hydrogenation reaction vessel 10, on the other hand, is removed from the upper end of the settling section 16 through the discharge port 17 and is passed through the conduit 18 to the high pressure flash drum 20. By appropriate adjustment of the relative sizes of the reaction chamber 14 and settling section 16, substantially all of the unreacted aluminum metal may be settled out of the upflowing reaction product and caused to remain in the lower portion of the settling section 16 and in the reaction chamber 14. In this manner, a high concentration of activated aluminum metal may be constantly maintained in the reaction vessel 10, resulting in the several benefits and advantages hereinbefore described.

As further illustrative of the manner in which the invention may be practiced, the following example of conditions of temperature and pressure and typical material balance data for the system is presented:

A slurry containing about 3 percent by weight subdivided aluminum metal, 41 percent by weight triethyl aluminum and 56 percent by weight kerosene (boiling range 360° F. to 500° F.) is continuously charged to the bottom of a 4000 gallon hydrogenation reactor (corresponding to reaction vessel 10 in the accompanying drawing) at a rate of about 50 gallons per minute. The aluminum metal contains about 0.1 percent by weight zirconium metal as a catalytic material.

In a preferred mode of operation, the aluminum slurry is introduced in one stream containing on a weight basis about 10 percent of the aluminum metal, 25 percent trialkyl aluminum and 65 percent by weight kerosene. A second stream is concurrently introduced to the hydrogenation reactor which contains no comminuted aluminum metal and which is composed of about 50 percent triethyl aluminum and 50 percent kerosene. Both streams are introduced to the reaction vessel at the bottom thereof. When two streams are used in the manner described for introducing the triethyl aluminum, aluminum metal and solvent to the hydrogenation reactor, the slurry stream containing 10 percent by weight aluminum metal is charged to the reactor at a rate of about 14 gallons per minute and the triethyl aluminum-kerosene stream is charged to the reactor at a rate of about 36 gallons per minute.

Hydrogen gas is introduced to the bottom of the hydrogenation reaction vessel at the rate of 1500 standard cubic feet per minute. Within the reaction vessel, a hydrogen partial pressure of 1500 p.s.i.g. is maintained and the temperature is retained at about 270° F.

The effluent is removed from the top of the settling section of the hydrogenation reactor. It contains about 53 percent of the kerosene solvent, 17 percent triethyl aluminum, 30 percent dialkyl aluminum hydride and a negligible amount of aluminum metal.

The effluent removed from the hydrogenation reactor is passed to the high pressure flash tank where the pressure on the dialkyl aluminum hydride product is reduced to 600 p.s.i.g. The temperature in the high pressure flash tank is retained at about 270° F. Fuel gas consisting of hydrogen and methane are flashed from the effluent.

The liquid effluent from the high pressure flash tank is then passed to the ethylation reactor where, in one mode of practicing the invention, it may be contacted with ethylene gas which is introduced to the ethylation reactor at a rate of 2000 pounds per hour. The liquid effluent from the high pressure flash tank enters the ethylation reactor at a rate of 52 gallons per minute. The pressure in the ethylation reactor is 550 p.s.i.g. and the temperature is 290° F. The reaction product stream is removed from the ethylation reactor. It consists of about 47 percent by weight triethyl aluminum, about 49 percent by weight kerosene solvent, about 2.5 percent by weight dialkyl aluminum hydride, a negligible amount of aluminum metal, with the balance of about 1 percent by weight consisting of light gases, including hydrogen, methane, ethane and propane.

From the foregoing description of the invention, it will be apparent that the present invention provides a novel apparatus for improving the process by which dialkyl aluminum hydride may be manufactured and, consequently, for improving the overall process hereinbefore described for production of trialkyl aluminum. Although certain features have been discussed hereinbefore by way of example, the details of the apparatus and process which have been described in the foregoing specification are not intended to be limiting, or to restrict the scope of the present invention, except as such restriction may be required by the language and construction of the appended claims. In other words, insofar as innovations and modifications in the process conditions, and in structural details of the apparatus hereinbefore enumerated do not involve a departure from reliance upon the principles underlying the invention, such modifications and innovations are deemed to be encompassed within the spirit and scope of the invention.

What is claimed is:

1. In a process for preparing dialkylaluminum hydride, in which the alkyl groups thereof contain from 2 to 20 carbon atoms, wherein the process comprises:
   (a) contacting in a reaction zone, trialkylaluminum wherein the alkyl groups contain from 2 to 20 carbon atoms, hydrogen, and aluminum, at a temperature in the range of from about 200° F. to about 350° F. and a hydrogen pressure in the range of from about 200 p.s.i.g. to about 5,000 p.s.i.g., said aluminum being present in a stoichiometric excess over that required by the reaction $$Al + \tfrac{3}{2}H_2 + 2AlR_3 \rightarrow 3AlR_2H$$

and
   (b) removing the dialkylaluminum hydride from the reaction zone;
   the improvement which comprises:
   (1) flowing the reactants upwardly in a reaction zone, capable of handling aluminum particles as large as 0.25 inch, while maintaining mechanical agitation in said reaction zone; and
   (2) then flowing the reactants upwardly into an enlarged settling section at the upper portion of the reaction zone, thus partially arresting the movement of the reactants to settle out the excess unreacted aluminum metal.

2. In a process for preparing dialkylaluminum hydride, in which the alkyl groups thereof contain from 2 to 20 carbon atoms, wherein the process comprises:
   (a) introducing to the lower end of a vertical single-stage reaction zone
       (1) hydrogen gas, and
       (2) a slurry of subdivided aluminum metal in a liquid trialkylaluminum compound, in which the alkyl substituents of the trialkylaluminum compound contain from 2 to 20 carbon atoms, said aluminum metal being present in a stoichiometric excess over that required by the reaction $$Al + \tfrac{3}{2}H_2 + 2AlR_3 \rightarrow 3AlR_2H$$

(b) flowing the reactants upwardly in the reaction zone while maintaining the temperature in the reaction zone in the range of from about 200° F. to about 350° F. and the pressure therein from about 200 p.s.i.g. to about 5,000 p.s.i.g.; and
   (c) removing the dialkylaluminum hydride from the upper end of said reaction zone;
   the improvements which comprise:
   (1) mechanically agitating the slurry-gas mixture in the lower portion of said reaction zone, and
   (2) flowing the reactants upwardly into an enlarged settling section at the upper portion of the reaction zone, thus partially arresting the movement of the reactants to settle out the excess unreacted aluminum metal.

3. The process of claim 2 wherein said subdivided aluminum metal contains an intentionally added, reaction-promoting amount of a metal selected from the group consisting of zirconium and titanium.

4. The process of claim 3 wherein said dialkylaluminum hydride and said trialkylaluminum compound are diethylaluminum hydride and triethylaluminum, respectively.

References Cited

UNITED STATES PATENTS

| | | | |
|---|---|---|---|
| 2,930,808 | 3/1960 | Zosel | 260—448 |
| 3,104,252 | 9/1963 | Radd et al. | 260—448 |
| 3,207,770 | 9/1965 | Ziegler et al. | 260—448 |

TOBIAS E. LEVOW, *Primary Examiner.*

H. M. S. SNEED, *Assistant Examiner.*

UNITED STATES PATENT OFFICE
CERTIFICATE OF CORRECTION

Patent No. 3,388,142                                June 11, 1968

Daniel F. Cameron et al.

It is certified that error appears in the above identified patent and that said Letters Patent are hereby corrected as shown below:

Column 2, line 29, "screen" should read -- screens --.
Column 3, line 18, "formulation" should read -- formation --.
Column 5, lines 34 and 35, "pound. Because of the pyrophoric nature of the trialkyl aluminum by" should read -- and maintaining the apparatus used in producing trialkyl aluminum
Column 6, line 57, "campounds" should read -- compounds --;
line 73, "multitage" should read -- multistage --. Column 8, line 32, "4,4-diethyl-1-diethyl-1-decene" should read -- 4,4-diethyl-1-decene --.

Signed and sealed this 18th day of November 1969.

(SEAL)

Attest:

Edward M. Fletcher, Jr.                        WILLIAM E. SCHUYLER, JR

Attesting Officer                                 Commissioner of Patents